United States Patent [19]

Izumi et al.

[11] Patent Number: 4,529,923
[45] Date of Patent: Jul. 16, 1985

[54] CIRCUIT FOR DRIVING A STEPPING MOTOR

[75] Inventors: Hiroshi Izumi, Tamayama; Hiroshi Koike, Morioka, both of Japan

[73] Assignee: Alps Electric Co., Ltd., Japan

[21] Appl. No.: 531,763

[22] Filed: Sep. 13, 1983

[30] Foreign Application Priority Data

Sep. 14, 1982 [JP] Japan ............................. 57-139734

[51] Int. Cl.³ .......................................... H02K 29/04
[52] U.S. Cl. ..................................... 318/696; 318/685
[58] Field of Search .................. 318/685, 696, 611; 310/49 R; 400/144.2

[56] References Cited

U.S. PATENT DOCUMENTS

| 3,893,012 | 7/1975 | Lin | 318/696 |
| 4,262,240 | 4/1981 | Arqi | 318/685 |
| 4,293,233 | 10/1981 | Hoffman | 400/144.2 |
| 4,297,626 | 10/1981 | Chiang | 318/696 |

OTHER PUBLICATIONS

Proceedings Eleventh Annual Symposium on Incremental Motion Control, Systems and Devices, May 1982, p. 295, Kno and Butts.

Primary Examiner—William M. Shoop
Assistant Examiner—Saul M. Bergmann
Attorney, Agent, or Firm—Guy W. Shoup

[57] ABSTRACT

A circuit for driving a stepping motor comprises a sensor for detecting when the stepping motor is in a hold position, a counter for counting an output from the sensor, a hold pulse pattern generator for generating a hold pulse pattern to hold the stepping motor in the hold position, a shift circuit for shifting the hold pulse pattern from the hold pulse pattern generator, an inverter circuit for inverting hold pulse pattern from the hold pulse pattern generator, and a comparator for comparing an output from the counter with a reference value and producing an output to select one of the hold pulse pattern from the hold pulse pattern generator, a shifted hold pulse pattern from the shift circuit, and an inverted hold pulse pattern from the inverter circuit.

4 Claims, 7 Drawing Figures

CIRCUIT FOR DRIVING A STEPPING MOTOR

BACKGROUND OF THE INVENTION

The present invention relates to closed-loop control for a stepping motor.

Prior control circuits for driving stepping motors have been disadvantageous in that the torque of the stepping motor is greatly reduced as it operates at higher speeds, and high-speed operation is not ordinarily expected for conventional stepping motors. Various attempts have been practiced to eliminate the above difficulty, but have been found unsatisfactory.

SUMMARY OF THE INVENTION

It is an object of the present invention to provide a a simple circuit arrangement for bidirectionally driving a stepping motor at high speeds.

According to the present invention, a circuit for driving a stepping motor comprises a sensor for detecting when the stepping motor is in a hold position, a counter for counting an output from the sensor, a hold pulse pattern generator for generating a hold pulse pattern to hold the stepping motor in the hold position, a shift circuit for shifting the hold pulse pattern from the hold pulse pattern generator, an inverter circuit for inverting hold pulse pattern from the hold pulse pattern generator, and a comparator for comparing an output from the counter with a reference value and producing an output to select one hold pulse pattern from the hold pulse pattern generator, a shifted hold pulse pattern from the shift circuit, and an inverted hold pulse pattern from the inverter circuit.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
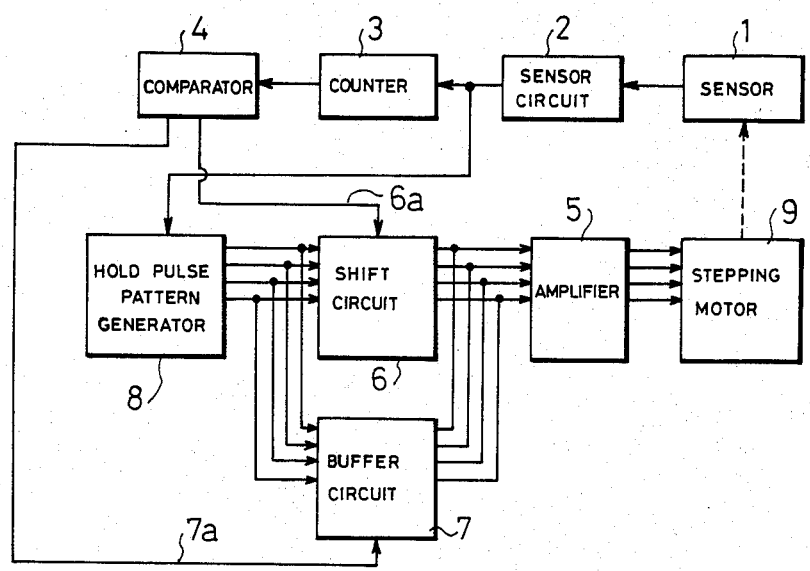
FIG. 1 is a block diagram of a conventional circuit for driving a stepping motor.
Figure 2:
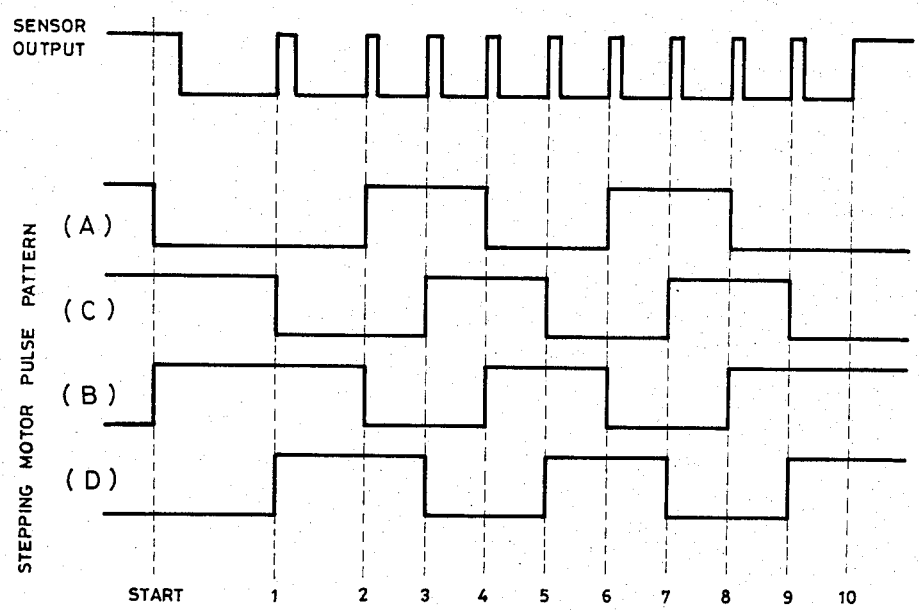
FIG. 2 is a timing chart showing the operation of the stepping motor.

FIGS. 1 through 4 show a conventional circuit for driving a stepping motor under closed-loop control. As shown in FIG. 1, a sensor 1 for detecting the position of a core in a stepping motor 9 comprises a photosensor, for example, for detecting the hold position of the stepping motor 9 while the latter is being driven with two phases excited at a time. A waveform of the output from the sensor 1 is shaped by a sensor circuit 2, which issues an output to a counter 3 for counting the output pulses from the sensor circuit 2. A hold pulse pattern generator 8 generates a pulse pattern for holding the stepping motor in a position in which the core is detected by the sensor 1. An output pulse pattern from the hold pattern generator 8 is applied to both a shift circuit 6 and a buffer circuit 7, which are supplied with enable signals 6a, 7a from a comparator 4 which compares the output of the counter 3 with a predetermined count number. Either one of the shift circuit 6 and the buffer circuit 7 is selected at a time for delivering a pulse pattern to an amplifier 5 which applies the pulse pattern of a prescribed voltage to the stepping motor 9.

For incrementing the stepping motor 9 in ten steps, for example, the comparator 4 is set for "9" as a reference count in advance. While the counter 3 produces an output ranging from 0 to 9, the shift circuit 6 is enabled. When the output from the counter 3 is cleared, the stepping motor 9 is supplied with a pulse pattern which constitutes a shifted hold pulse pattern from the generator 8. The stepping motor 9 is now incremented until the count from the counter 3 reaches ten. Thereafter, the buffer circuit 7 is enabled to allow the hold pulse pattern from the generator 8 to be applied to the stepping motor 9, which is then stopped.

Figure 3:
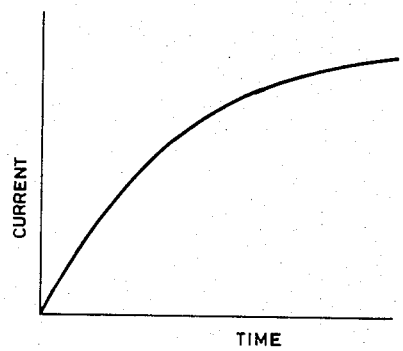
FIG. 3 is a graph illustrative of the relationship between a current flowing through a coil in the prior stepping motor and time.
Figure 4:
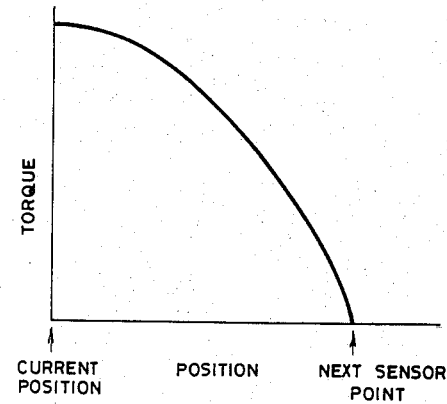
FIG. 4 is a graph showing the relationship between the position of a core in the prior stepping motor and a torque.

With the conventional control circuit arrangement, high-speed operation of the stepping motor 9 cannot be achieved as it suffers from the following problem:

As shown in FIG. 3, when a voltage is applied to the coils in the stepping motor 9, a current flowing therethrough cannot be increased quickly due to the inductance of the coils, with a resultant time delay before the stepping motor 9 produces its torque. The torque of the stepping motor 9 is gradually reduced as the hold position is approached as illustrated by the torque curve in FIG. 4. As a result, the torque of the stepping motor 9 is limited due to the delay in the rising of the current immediately after phases are changed. As the current is increased and the hold position is approached, the torque of the stepping motor 9 approaches the minimum point of the torque curve, with the consequence that the torque is also limited. Accordingly, the torque of the stepping motor 9 is greatly reduced as it operates at higher speeds, and no high-speed operation is expected of conventional stepping motors. There have been practiced various ways of overcoming the above difficulty. One solution is a resistor connected in series with the stepping motor 9 for allowing the current to be increased rapidly. According to another improvement, the sensor 1 is designed to have a leading angle for changing phases in advance of a position in which they are normally changed. However, the former attempt requires a higher voltage from the power supply. With the latter proposal, the leading angle is only 50% at maximum and hence insufficient when the stepping motor is to be rotated bidirectionally, and it is impossible to detect whether the stepping motor 9 has reached the final position.

Figure 6:
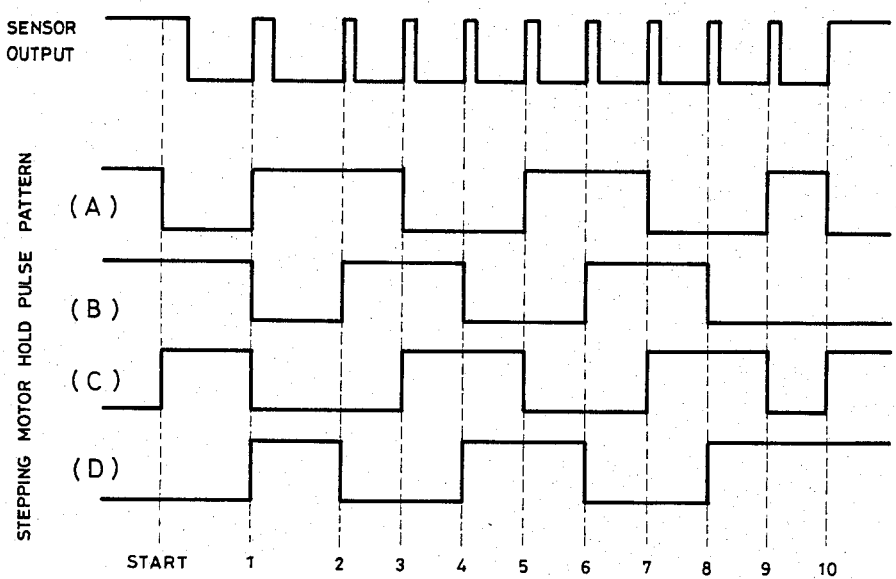
FIG. 6 is a timing chart showing the operation of the stepping motor shown in FIG. 5.
Figure 7:
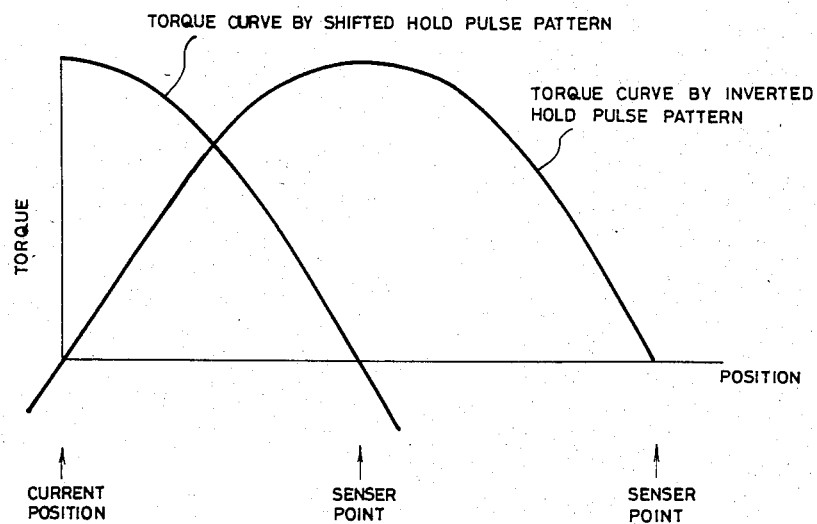
FIG. 7 is a graph showing torque curves of hold pulse patterns processed by a shift circuit and an inverter circuit.

The present invention will be described with reference to FIGS. 5 through 7. Identical reference characters in FIGS. 5 through 7 denote identical parts in FIGS. 1 through 4.

Figure 5:
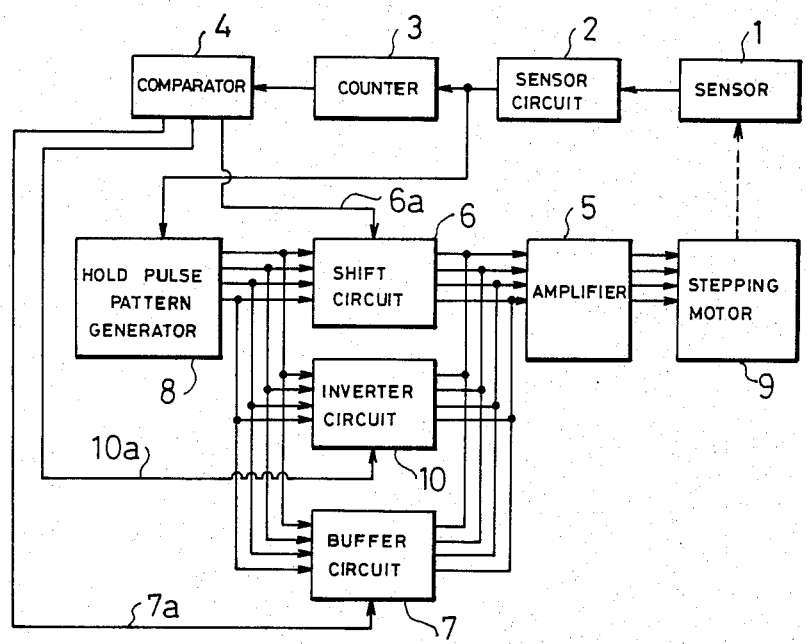
FIG. 5 is a block diagram of a circuit for driving a stepping motor according to the present invention.

As shown in FIG. 5, an inverter circuit 10 is connected between the hold pulse pattern circuit 8 and the amplifier 5 in parallel relation to the shift circuit 6 and the buffer circuit 7. This inverter circuit may be the well-known inverter LS368A of Texas Instruments of Dallas, Tex., for example. The inverter circuit 10 is supplied with an enable signal 10a for inverting a hold pulse pattern from the hold pulse pattern generator 8. Either the shift circuit 6, the inverter circuit 10 or the buffer circuit 7 is selected one at a time by the comparator 4, and produces an output which is applied through the amplifier 5 to the stepping motor 9.

To rotate the stepping motor 9 in certain increments, the shift circuit 6, the inverter circuit 10 and the buffer circuit 7 are successively enabled in the order named. When the stepping motor 9 is to be incremented in ten steps, for example, the comparator 4 is set so that the shift circuit 6 is enabled when the count from the counter 3 is zero, the inverter circuit 10 is enabled when the count is in the range of from 1 to 9, and the buffer circuit 7 is enabled when the count is 10 or more. The timing chart of such operation is shown in FIG. 6. FIG. 7 shows the difference between torque curves as plotted when the inverter circuit 10 and the shift circuit 6 are enabled, respectively. According to the torque curve available when the inverter circuit 10 is enabled, the torque is zero and unstable at a current position of the motor. Since the inverter circuit 10 is not enabled until after the shift circuit 6 has been enabled and the stepping motor 9 has started moving the stepping motor can go through the unstable torque point due to its inertia.

With the arrangement of the present invention, when the hold pulse pattern having passed through the inverter circuit is applied to the stepping motor, the torque produced by the stepping motor is limited due to a delay in the increase of the current because of coil inductances immediately after phases have been changed. Since the torque on the torque curve is small immediately after phases have been changed, the limited torque has no appreciable effect on the operation of the stepping motor. After phases have been changed, the torque is increased as the current becomes greater, so that any adverse effects can substantially be eliminated which would result from a limited torque as the current increases, as in the prior art. The rate of utilization of the current is improved so that the stepping motor can be driven at high speeds. Actual measurements using the same current show that the driving circuit of the invention is capable of operating the stepping motor at a speed which is about 1.5 to 3 times the speed at which the stepping motor can be driven by the conventional driving circuit. The sensor is set for detecting the hold position, and hence can easily be adjusted. Bidirectional rotation of the stepping motor can readily be accomplished under the control of the driving circuit simply by reversing the direction in which the hold pulse pattern is shifted by the shift circuit. Error detection capability can also easily be added as the sensor output is produced at the final motor position. The driving circuit according to the present invention is highly practically feasible as it is of a simple circuit arrangement, can operate the stepping motor at a high efficiency and a high speed, can be adjusted with ease, and provided with error detector ability easily.

Although a certain preferred embodiment has been shown and described, it should be understood that many changes and modifications may be made therein without departing from the scope of the appended claims.

What is claimed is:

1. A circuit for driving a stepping motor, comprising:
   (a) a sensor for detecting when the stepping motor is in a hold position;
   (b) a counter for counting an output from said sensor;
   (c) means including a hold pulse pattern generator for generating a hold pulse pattern to hold the stepping motor in said hold position;
   (d) means including a shift circuit for shifting the hold pulse pattern from said hold pulse pattern generator;
   (e) means including an inverter circuit for inverting said hold pulse pattern from said hold pulse pattern generator; and
   (f) means including a comparator for comparing an output from said counter with a reference value and producing an output to select one of the hold pulse pattern from said hold pulse pattern generator, a shifted hold pulse pattern from said shift circuit, and an inverted hold pulse pattern from said inverter circuit.

2. A circuit according to claim 1, wherein said shift circuit is enabled by the output from said comparator at an unstable point where the torque of the stepping motor is zero when the stepping motor starts rotating, and said inverter circuit is enabled by the output from said comparator after the stepping motor has started rotating.

3. A circuit according to claim 1, including means including a buffer circuit connected parallel to said shift circuit and said inverter circuit for holding the hold pulse pattern from said hold pulse pattern generator.

4. A circuit according to claim 3, wherein the output from said comparator is applicable as an enable signal to one of said shift circuit, said inverter circuit, and said buffer circuit at a time.

* * * * *